No. 854,186.  
PATENTED MAY 21, 1907.

H. L. VOSS.  
TIRE PROTECTOR.  
APPLICATION FILED JUNE 27, 1906.

2 SHEETS—SHEET 1.

Witnesses  
Inventor  
H. L. Voss,  
By Chandlee & Chandlee  
Attorneys

No. 854,186. PATENTED MAY 21, 1907.
H. L. VOSS.
TIRE PROTECTOR.
APPLICATION FILED JUNE 27, 1906.
2 SHEETS—SHEET 2.
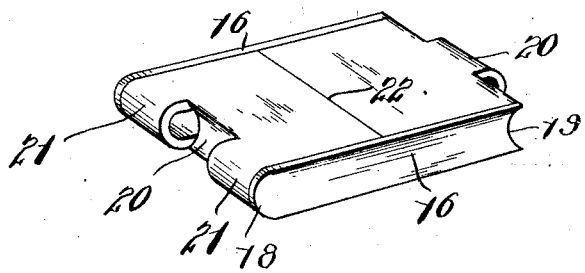
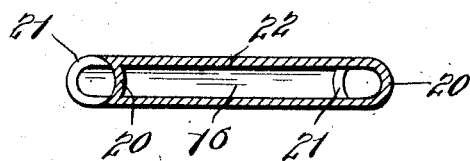
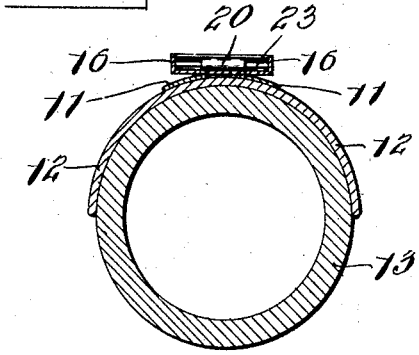
Witnesses
Inventor
H. L. Voss,
By Chandler & Chandler
Attorneys

UNITED STATES PATENT OFFICE.

HAYNIE L. VOSS, OF MILES, TEXAS.

TIRE-PROTECTOR.

No. 854,186.  Specification of Letters Patent.  Patented May 21, 1907.

Application filed June 27, 1906. Serial No. 323,703.

*To all whom it may concern:*

Be it known that I, HAYNIE L. VOSS, a citizen of the United States, residing at Miles, in the county of Runnells, State of Texas, have invented certain new and useful Improvements in Tire-Protectors; and I do hereby declare the following to be a full, clear, and exact description of the invention, such as will enable others skilled in the art to which it appertains to make and use the same.

This invention has relation to devices for armoring and protecting the tread of tires for vehicle wheels; and it consists of a flexible chain composed of resilient links attached to a leather strap and these two parts fastened to a band composed of rubber-belt stock. The whole is made into a band with a concaved inner side, adapting it to fit about half way around the outside tire and to be frictionally held in place thereon.

The invention also consists of hollow resilient links for chains and chains formed of hollow resilient links.

The invention is clearly illustrated in the annexed drawings, forming a part of this specification, and it will be disclosed in view of the said drawings, and in the following detailed description of the construction and mode of operation of the device.

Figure 1:
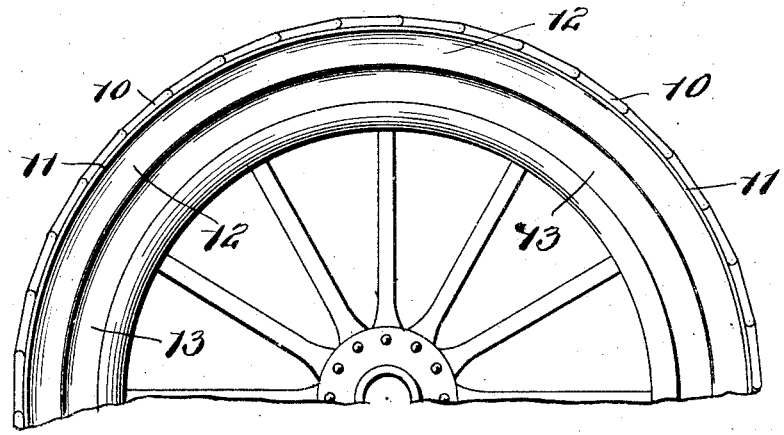
Figure 2:
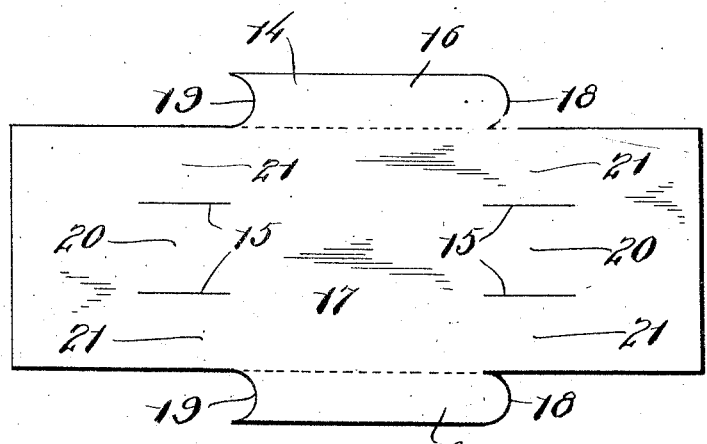

Of the said drawings:—Figure 1 is a side view of the wheel and armor. Fig. 2 is a plan view of the blank. Fig. 3 is a perspective view of a link. Fig. 4 is a longitudinal section of the link. Fig. 5 is a transverse view of a tire with the armor in place.

Similar numerals of reference designate similar parts or features, as the case may be, wherever they occur.

In the drawings, 10 designates a chain constructed in accordance with my invention; 11 the strap of leather to which the chain is secured; 12 the rubber-belting material with which the chain and strap are united; and 13 the original or regular tire of an automobile or other vehicle.

In the construction of the chain 10, I prefer to make the links resilient and relatively soft by making them hollow, so that when the vehicle wheel passes over quite an uneven surface of ground the chain will yield and obviate any tendency to jarring effects. Under this constructive character, I make the link from a blank 14, that may be as long as desired, with parallel sides, excepting as hereinafter indicated, and with straight parallel ends. About one-fourth of the distance inward from each end two parallel slits 15 are formed through the metal, and on the opposite sides, between the inner ends of the slits there are lateral extensions 16 that are adapted to be folded up at right angles to the body part 17 forming protecting flanges for the sides of the link. One end of the lateral extensions is rounded outward, as at 18, and the other end is concaved, as it were, as at 19, so that the outwardly rounded end 18 will fit in the concaved end 19. At one end the portion of material 20 between the slits 15 will be bent inwardly, and at the opposite end the said corresponding portion of material will be bent outwardly, and on the first-mentioned end the portion of material 21 outside of the slits 15 will be bent outwardly, while at the opposite end the corresponding portions of material will be bent inwardly, the bends being made on a curve that will bring the ends 22 together, with the portions between the bends parallel with the body part and with their side edges meeting the upper edges of the lateral flanges 16.

The bends in the material 20 and 21 form knuckles for the reception therethrough, when the ends of two hinges are brought together, of the pintle or pivot pin 23, and in this way constituting a chain-belt of the nature hereinbefore specified, having hollow resilient links. Instead of making the chain-links hollow and resilient, they may, in some cases, be made solid with holes formed transversely through the knuckles of the links for the pintles, all of the said features being of the same form as those employed in the making of the hollow links. When the links are made hollow, it is designed that the side flanges at their ends shall cover the ends of the pintles 23, as well as to close the sides, and thus keep mud and sand from getting inside the hollow links.

When the protector-rim or band is completed it may be put on the tire of the wheel, when the said tire is "down," and it will be tightened thereon by pumping up the tire, as will be readily understood by those skilled in the art without further explanation. When the link is made solid, it may be made out of about one-eighth inch steel or iron cut in proper form or pattern. When the said link is made hollow, the stock used will be thinner and as resilient and soft as circumstances may call for. Moreover, when the links are made hollow, they may have some of their features changed in form, within the limits of mechanical skill, without departing from the general nature or spirit of the invention.

The invention, when applied to tires, affords great protection thereto so that they will last much longer, and the use of the improvements or pneumatic tires renders them proof against puncture within the limits of the chain, and substantially so within the limits of the complete band.

What is claimed as the invention, is:—

1. A chain for armoring and protecting the tread of vehicle tires consisting of hollow resilient links of metal pivotally connected at their ends, and provided with means at their sides to keep mud and other dirt from entering the hollows of the links combined with a strap and band, to which said chain is connected on the outer surface.

2. A chain for armoring and protecting the tread of vehicle tires consisting of hollow resilient links of metal pivotally connected at their ends and having flanges at their sides to keep mud and other dirt from entering the hollow of the links.

In testimony whereof, I affix my signature, in presence of two witnesses.

HAYNIE L. VOSS.

Witnesses:
C. L. ROOT,
J. Z. BRADFORD.